(12) United States Patent
Kim et al.

(10) Patent No.: US 12,332,982 B2
(45) Date of Patent: Jun. 17, 2025

(54) CONTROLLER FOR CONTENT SEARCH AND DISPLAY ACROSS MULTIPLE EXTERNAL DEVICES

(71) Applicant: Samsung Display Co., Ltd., Yongin-si (KR)

(72) Inventors: Hyunjung Kim, Seongnam-Si (KR); Jinoh Kwag, Suwon-Si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 743 days.

(21) Appl. No.: 17/270,776

(22) PCT Filed: Aug. 22, 2019

(86) PCT No.: PCT/KR2019/010723
§ 371 (c)(1),
(2) Date: Feb. 23, 2021

(87) PCT Pub. No.: WO2020/040579
PCT Pub. Date: Feb. 27, 2020

(65) Prior Publication Data
US 2021/0342431 A1 Nov. 4, 2021

(30) Foreign Application Priority Data
Aug. 24, 2018 (KR) .......................... 10-2018-0099300
Oct. 23, 2018 (KR) .......................... 10-2018-0126791

(51) Int. Cl.
*G06F 21/32* (2013.01)
*G06F 16/43* (2019.01)
*H04N 21/422* (2011.01)

(52) U.S. Cl.
CPC .............. *G06F 21/32* (2013.01); *G06F 16/43* (2019.01); *H04N 21/42204* (2013.01)

(58) Field of Classification Search
CPC ........ G06F 21/32; G06F 16/432; G06F 16/48; G06F 16/483; G06F 16/487; G06F 16/489; G06F 16/43; H04N 21/42204
See application file for complete search history.

(56) References Cited

U.S. PATENT DOCUMENTS 8,776,141 B2  7/2014  Lee et al.
10,497,197 B2  12/2019  Yamamoto Murakami et al.
(Continued)

FOREIGN PATENT DOCUMENTS

CN          103647750        3/2014
KR     10-2010-0069200        6/2010
(Continued)

OTHER PUBLICATIONS

International Search Report corresponding to International Application No. PCT/KR2019/010723 dated Nov. 28, 2019.
(Continued)

*Primary Examiner* — Brian F Shaw
(74) *Attorney, Agent, or Firm* — KILE PARK REED & HOUTTEMAN PLLC

(57) ABSTRACT

A controller includes an input part that receives a content request, a control part that determines content based on the content request, a communication part that receives data corresponding to the content from a first external device and searches for content information based on the data, a display panel that displays a search result for the content request, a sensor part that receives user authentication information, and a memory that stores the user authentication information and an address corresponding to the user authentication information, wherein the communication part transmits the search result to the address.

19 Claims, 18 Drawing Sheets

(56) References Cited

U.S. PATENT DOCUMENTS

| | | | |
|---|---|---|---|
| 2007/0081399 A1 | 4/2007 | Kishimoto | |
| 2007/0222901 A1 | 9/2007 | Tsubota et al. | |
| 2013/0036181 A1 | 2/2013 | Choi et al. | |
| 2013/0104172 A1* | 4/2013 | Lee et al. ................. | G06F 3/00 |
| | | | 725/60 |
| 2013/0135357 A1 | 5/2013 | Rhee et al. | |
| 2014/0013350 A1 | 1/2014 | Pan | |
| 2014/0053189 A1 | 2/2014 | Lee et al. | |
| 2014/0145834 A1 | 5/2014 | Cavgalar | |
| 2016/0080793 A1* | 3/2016 | Ruffini ............... | H04N 21/8586 |
| | | | 725/34 |
| 2016/0292404 A1* | 10/2016 | Tseng ..................... | G06F 21/31 |
| 2016/0295291 A1 | 10/2016 | Oh et al. | |
| 2016/0306996 A1* | 10/2016 | Kulkarni ............. | G06F 21/6245 |
| 2018/0059884 A1* | 3/2018 | Kim et al. ............. | G06F 3/041 |
| 2018/0124438 A1* | 5/2018 | Barnett ................ | H04N 21/234 |
| 2018/0139405 A1* | 5/2018 | Beak et al. ............. | H04N 5/44 |

FOREIGN PATENT DOCUMENTS

| | | |
|---|---|---|
| KR | 10-2011-0070052 | 6/2011 |
| KR | 10-2013-0044770 | 5/2013 |
| KR | 10-2013-0090489 | 8/2013 |
| KR | 10-2014-0023852 | 2/2014 |
| KR | 10-2016-0027855 | 3/2016 |
| KR | 10-2016-0066500 | 6/2016 |
| KR | 10-2017-0052353 | 5/2017 |
| WO | 2013/082334 | 6/2013 |

OTHER PUBLICATIONS

Written Opinion, with English translation, corresponding to International Application No. PCT/KR2019/010723, dated Nov. 28, 2019.

\* cited by examiner

FIG. 13
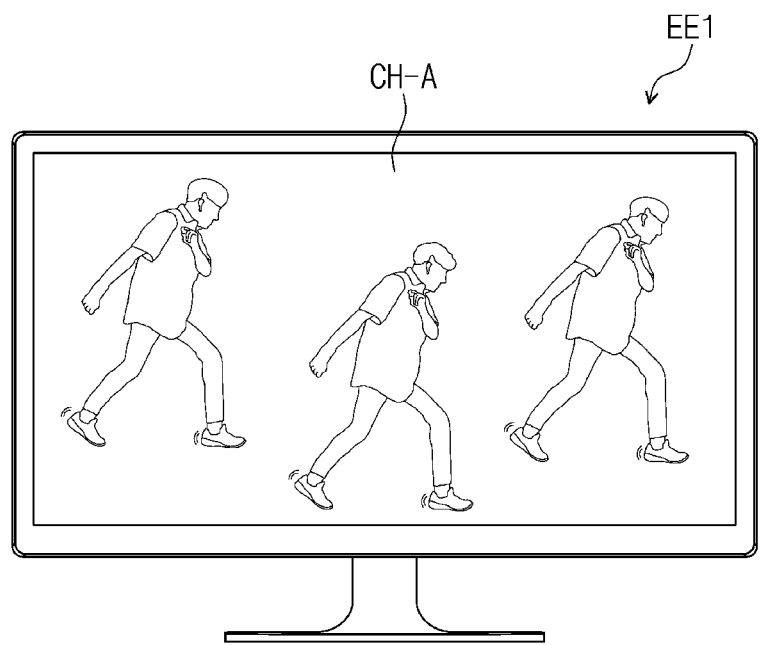
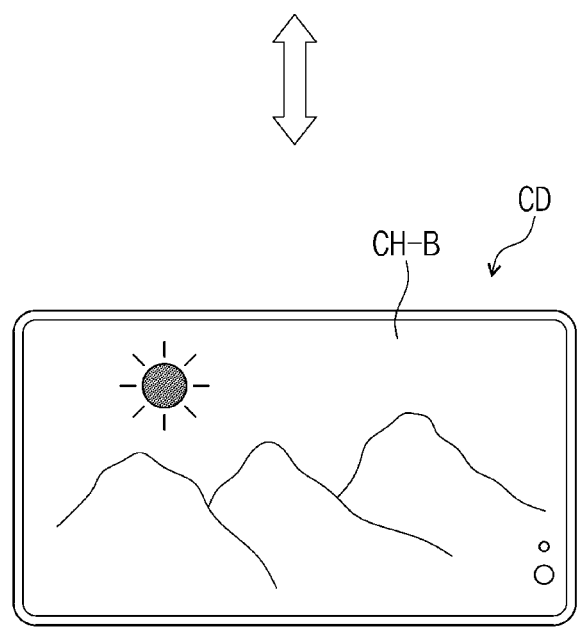

FIG. 14
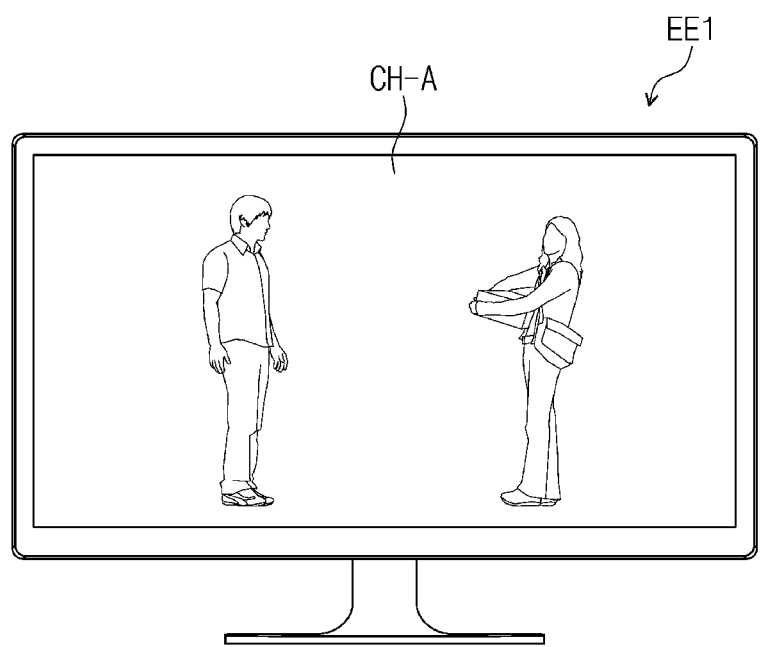
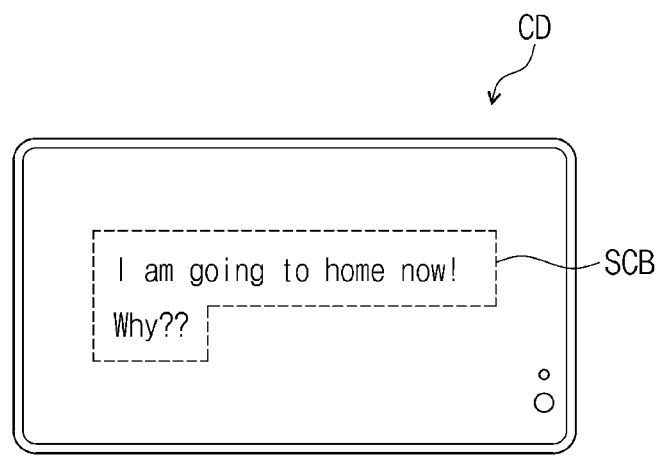

FIG. 15
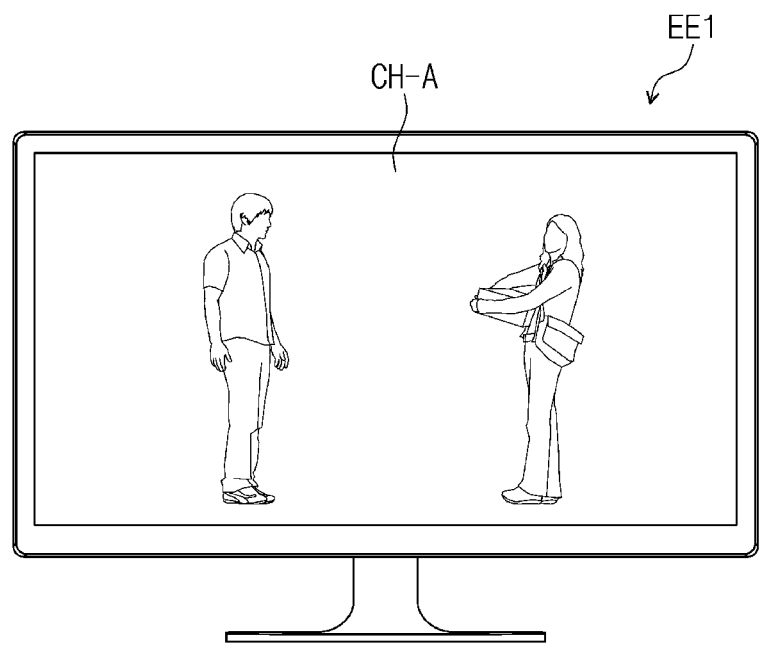
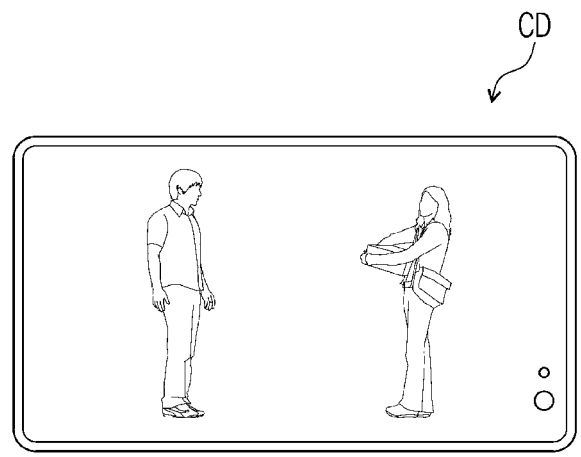

CONTROLLER FOR CONTENT SEARCH AND DISPLAY ACROSS MULTIPLE EXTERNAL DEVICES

CROSS REFERENCE TO RELATED APPLICATION(S)

This application is a national entry of International Application No. PCT/KR2019/010723, filed on Aug. 22, 2019, which claims under 35 U.S.C. § 119(a) and 365(b) priority to and benefits of Korean Patent Application No. 10-2018-0099300 filed on Aug. 24, 2018 and Korean Patent Application No. 10-2018-0126791 filed on Oct. 23, 2018 in the Korean Intellectual Property Office, the entire contents of which are incorporated herein by reference.

BACKGROUND

1. Technical Field

The disclosure relates to a controller capable of short-range communication and long-range communication.

2. Description of the Related Art

A user may encounter various content through various electronic devices such as a display device displaying an image or an audio device outputting audio. In order to obtain information about the content, there may be required cumbersome efforts by users. For example, users may have to memorize the content and obtain information about the content through Internet searching, or users may have to make inquiries to other people about the content.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure relates to a controller that enables short-range communication and long-range communication to search for content information in real time.

Embodiments provide a controller that may include an input part that receives a content request, a control part that determines content based on the content request, a communication part that receives data corresponding to the content from a first external device and searches for content information based on the data, a display panel that displays a search result for the content request, a sensor part that receives user authentication information, and a memory that stores the user authentication information and an address corresponding to the user authentication information, wherein the communication part transmits the search result to the address.

The input part may include at least one of an input detection part and an audio input part.

The data may be at least one of sound data, still image data, and video data.

The user authentication information may be at least one of identification (ID) and password, fingerprint, voice, face, iris, and blood vessel.

The sensor part may include at least one of a camera part, an input detection part, a fingerprint detection part, and an audio input part.

The address may comprise at least one of an email address, a mobile phone number, and second external device access information.

The second external device access information may be IP information, Wi-Fi access information, or BLUETOOTH™ access information.

The memory may store user interface information corresponding to the user authentication information.

The first external device may display an image of a first channel, and the display panel may display an image of a second channel.

The controller may further include an audio output part for outputting sound, wherein the audio output part outputs the sound of the second channel.

The first external device and the display panel may display a same image.

The first external device may display an image of a first channel, and the display panel may display subtitles of the first channel.

The communication part may transmit a control signal to a second external device, and the second external device may be at least one of a temperature control device, a lighting device, and a sound output device.

The first external device may be a display device, and the display device may communicate with a set-top box.

An image corresponding to an image data may be displayed on the display panel by receiving the image data from the set-top box before the first external device may be turned on.

The first external device may be a set-top box.

The display panel may be a flexible display panel.

The display panel may be a stretchable display panel.

In other embodiments, a controller may include an input part that receives a request from a user, a control part that determines content based on the request, a short-range communication part that receives data corresponding to the content from a first external device, a long-range communication part that searches for content information based on the data, and a display panel that outputs a search result.

The controller may further include a sensor part that receives user authentication information, and a memory that stores the user authentication information and an address corresponding to the user authentication information, wherein the short-range communication part or the long-range communication part transmits the search result to the address.

The controller may be capable of short-range communication and long-range communication. Accordingly, the controller may receive data corresponding to the content from an external device and search for the data. The process of obtaining information on the content may be easier. Also, the controller may transmit the searched content information to an address corresponding to the user authentication information. The address may be set by an individual such as access information of an external device, a mobile phone number, or an email address. Accordingly, the control device transmits the searched content information to another external device through user authentication, and the user may easily access the content information from the other external device.

BRIEF DESCRIPTION OF THE DRAWINGS

FIG. 13 is a schematic state diagram illustrating an operation example of a controller according to an embodiment.

FIG. 14 is a schematic state diagram illustrating an operation example of a controller according to an embodiment.

FIG. 15 is a schematic state diagram illustrating an operation example of a controller according to an embodiment.

DETAILED DESCRIPTION OF THE EMBODIMENTS

Figure 1:
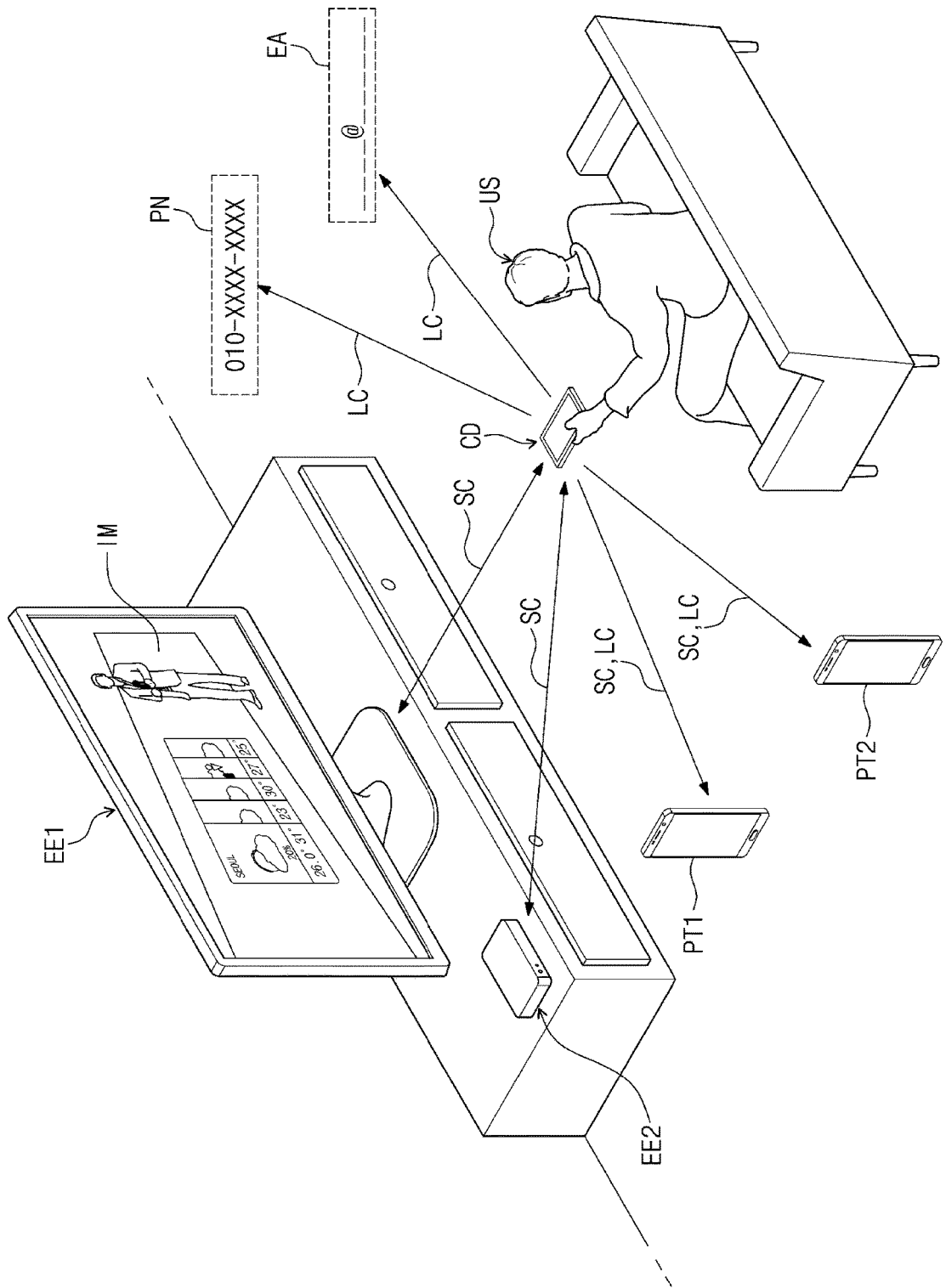
FIG. 1 schematically shows an example of using a controller according to an embodiment.

Hereinafter, the embodiments will be described with reference to the drawings.

When an element (or region, layer, part, etc.) is referred to as being "on", "connected to", or "coupled to" another element, it means that it may be directly placed on/connected to/coupled to other components, or a third component may be arranged therebetween.

Like reference numerals refer to like elements. In the drawings, the thicknesses, proportions, and dimensions of components may be exaggerated for effective description.

"And/or" includes all of one or more combinations defined by related components. For example, "A and/or B" may be understood to mean "A, B, or A and B." The terms "and" and "or" may be used in the conjunctive or disjunctive sense and may be understood to be equivalent to "and/or." The phrase "at least one of" is intended to include the meaning of "at least one selected from the group of" for the purpose of its meaning and interpretation. For example, "at least one of A and B" may be understood to mean "A, B, or A and B."

It will be understood that the terms "first" and "second" are used herein to describe various components but these components should not be limited by these terms. The above terms are used only to distinguish one component from another. For example, a first component may be referred to as a second component and vice versa. The terms of a singular form may include plural forms unless otherwise specified.

Unless otherwise defined or implied, all terms (including technical and scientific terms) used herein have the same meaning as commonly understood by one of ordinary skill in the art. Terms defined in a commonly used dictionary should be interpreted as having a meaning consistent with the meaning in the context of the related technology, and generally should not be interpreted in an ideal or overly formal sense unless explicitly defined as such herein.

In various embodiments of the disclosure, terms such as "comprise," "has", and "include" specify a property, a region, a fixed number, a step, a process, an element and/or a component but does not exclude other properties, regions, fixed numbers, steps, processes, elements and/or components.

Figure 2:
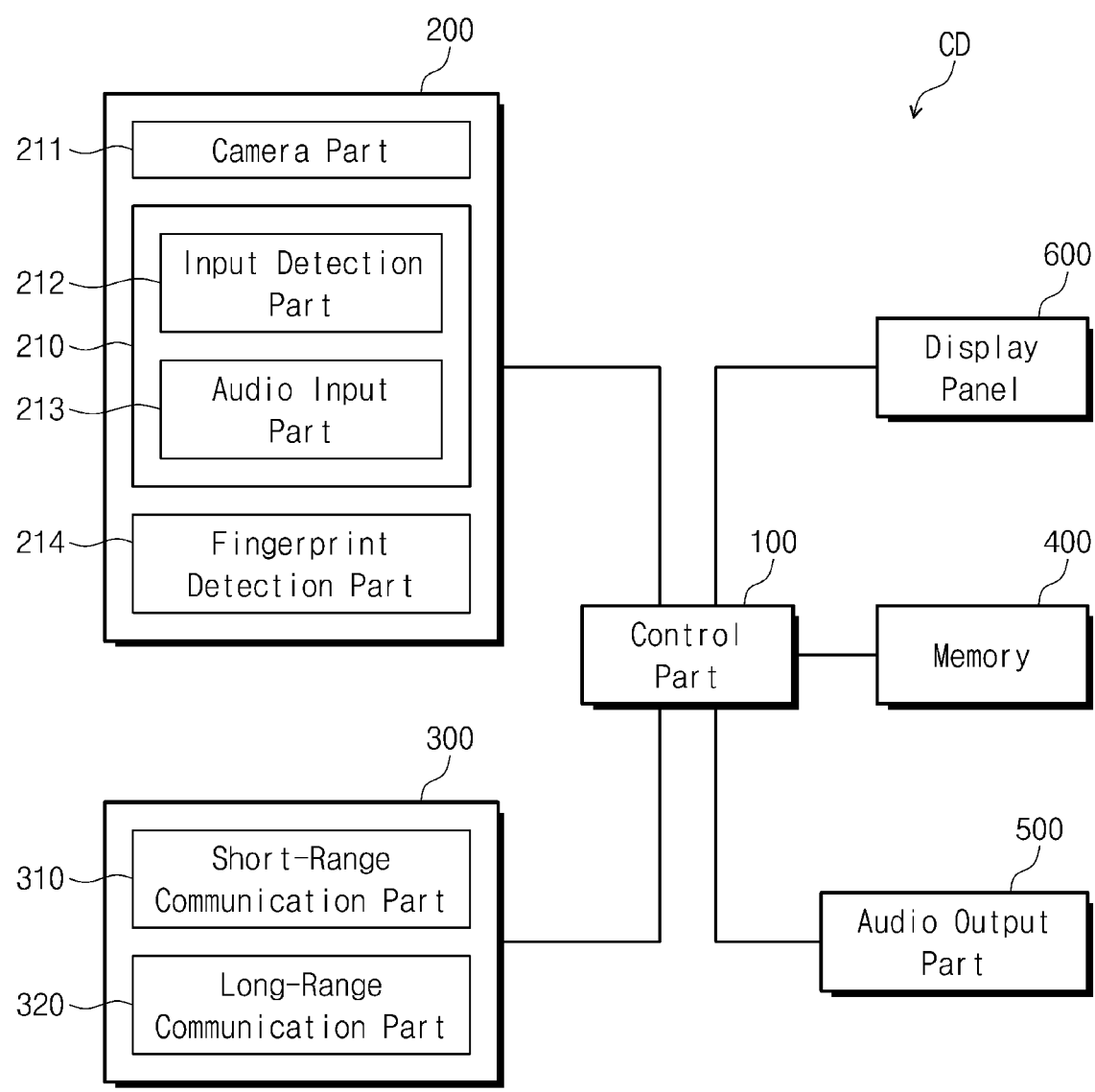
FIG. 2 is a schematic block diagram of the controller illustrated in FIG. 1 by way of example.

FIG. 1 schematically shows an example of using a controller according to an embodiment. FIG. 2 is a schematic block diagram of the controller illustrated in FIG. 1 by way of example.

Referring to FIGS. 1 and 2, a first external device EE1, a second external device EE2, and a controller CD are illustrated.

The first external device EE1 may be a display device such as a television or a monitor. The display device may be, for example, a liquid crystal display device, an organic light-emitting display device, a quantum dot display device, or a micro LED display device. However, these are only examples, and the type of display device is not limited to the examples. The first external device EE1 may display an image IM. In FIG. 1, a screen for displaying weather information is illustrated as an example of the image IM.

The second external device EE2 may be a set-top box. The second external device EE2 may be a device capable of communicating with the first external device EEL The second external device EE2 may provide image data received from the outside to the first external device EEL The second external device EE2 may be a home communication terminal for interactive multimedia communication and may play a role of connecting the first external device EE1 and an external network.

In an embodiment, in case that there is no second external device EE2, the first external device EE1 may display only images provided by some channels. However, in case that there is the second external device EE2, the first external device EE1 may display images provided by a large number of channels.

The controller CD may control at least one of the first external device EE1 and the second external device EE2. For example, a user US may turn on or turn off at least one of the first external device EE1 and the second external device EE2 using the controller CD. Also, the user US may change a channel provided by the first external device EE1 using the controller CD. The user US may adjust the volume provided by the first external device EE1 using the controller CD. For example, the controller CD may be understood as a remote controller or a device including a remote control function.

The controller CD according to an embodiment may search for content information based on data received from the first external device EE1 and/or the second external device EE2, and output the search result. Further, the controller EE1 may transmit the search result to an address corresponding to the user authentication information of the user US. Hereinafter, the controller CD will be described.

The controller CD may include a control part 100, a sensor part 200, a communication part 300, a memory 400, an audio output part 500, and a display panel 600. The components constituting the controller CD are merely examples, and the controller CD may further include other components, for example, a battery part, a charging part, or a position sensor in addition to the components disclosed in FIG. 2.

The control part 100 may control the overall operation of the controller CD. The control part 100 may be a part that controls the sensor part 200, the communication part 300, the memory 400, the audio output part 500, and the display panel 600. For example, the control part 100 may be a central processing part (CPU), a micro processor part (MPU), or an execution processing part (EPU).

The sensor part 200 may receive user authentication information of the user US. The user authentication information may be ID and password or bio information. The bio information may be, for example, a fingerprint, an iris, a voice, a face, or a blood vessel. However, this is merely an example, and user authentication information is not limited to the above example.

The sensor part 200 may include at least one of a camera part 211, an input detection part 212, an audio input part 213, and a fingerprint detection part 214. The iris or face information of the user US may be acquired through the camera part 211. An ID and a password, or fingerprint information of the user US may be acquired through the input detection part 212. The voice of the user US may be acquired through the audio input part 213. Fingerprint information of the user US may be acquired through the fingerprint detection part 214. The fingerprint detection part 214 and the input detection part 212 may be provided integrally, or may be provided separately.

The input part 210 may receive a request from the user US. At least some of the configuration of the sensor part 200 may be referred to as the input part 210. For example, the input detection part 212 and the audio input part 213 may be the input part 210. For example, the user US may input a request through a keyboard provided to the input detection part 212, and the user US may input a request through a voice command to the audio input part 213.

The input detection part 212 may detect an external input. The external input may include various types of external inputs such as a part of the user's body, a stylus pen, light, heat, or pressure. It may be possible to detect not only a touch that a part of the body such as a user's hand contacts, but also a close or adjacent spatial touch (e.g., hovering). A method that the input detection part 212 detects a touch may include various methods, such as a resistive film method, an optical method, a capacitive method, and an ultrasonic method, and is not limited to a specific example.

The audio input part 213 may receive an external sound signal by a microphone in a recording mode, a voice recognition mode, and the like and convert the received external sound signal into electrical voice data.

The communication part 300 may be a part for communicating with external devices. The communication part 300 may include a short-range communication part 310 and a long-range communication part 320. Each of the short-range communication part 310 and the long-range communication part 320 may include a transmission part for transmitting information to an external device and a reception part for receiving information from an external device.

The short-range communication part 310, for example, may perform short-range communication SC with the first external device EE1, the second external device EE2, a first terminal PT1, and a second terminal PT2, which may be disposed in the vicinity of the short-range communication part 310. The short-range communication SC may be a two-way communication. The short-range communication SC may include, for example, communication using BLUETOOTH™, communication using an infrared transceiver, or communication using Wi-Fi. However, this is merely an example, and the method of the short-range communication SC is not limited to the above example.

The long-range communication part 320 may perform long-range communication LC with the first terminal PT1, the second terminal PT2, an email server EA, or a mobile communication device PN. The long-range communication LC may be two-way communication or one-way communication. The long-range communication LC may be, for example, communication using a mobile phone network such as CDMA, WCDMA, or LTE. However, this is merely an example, and the method of the long-range communication LC is not limited to the above example.

The memory 400 may include volatile memory and/or nonvolatile memory. The volatile memory may include, e.g., DRAM, SRAM, or FeRAM. The nonvolatile memory may include, e.g., NAND FLASH, SSD or HDD.

The memory 400 may store user authentication information and an address corresponding to the user authentication information. The memory 400 may store user interface information corresponding to user authentication information. The memory 400 may store user authentication information, addresses corresponding to the user authentication information, and user interfaces corresponding to the user authentication information in a lookup table format. However, this is illustrated as an example, and in an embodiment, only the user authentication information and addresses corresponding to the user authentication information may be stored in the memory 400.

TABLE 1

| User authentication information | Address | User interface |
| --- | --- | --- |
| USER 1 | E-mail address | Mode 1 |
| USER 2 | Phone number | Mode 1 |
| USER 3 | External device access information | Mode 2 |
| USER 4 | E-mail address | Mode 3 |
| USER 5 | Phone number | Mode 4 |

Table 1 exemplarily shows a lookup table stored in the memory 400. The external device may be the first terminal PT1, the second terminal PT2, a tablet, a notebook computer, or a computer. The access information may be IP information, Wi-Fi access information, or BLUETOOTH™ access information. The audio output module 500 may convert the sound data received from the communication unit 300 or the sound data stored in the memory 400 and output the converted data to the outside. The audio output module 500 may be a speaker. The audio output module 500 may be omitted.

The audio output part 500 may convert the sound data received from the communication part 300 or the sound data stored in the memory 400 and output the converted data to the outside. The audio output part 500 may be a speaker. The audio output part 500 may be omitted.

The display panel 600 may include pixels and may display an image. The display panel 600 may be a rigid display panel or a flexible display panel. The display panel 600 may be a liquid crystal display panel, an organic light emitting display panel, a quantum dot display panel, or a micro LED display panel. However, this is only an example, and the type of the display panel 600 is not limited to the example.

Figure 3A:
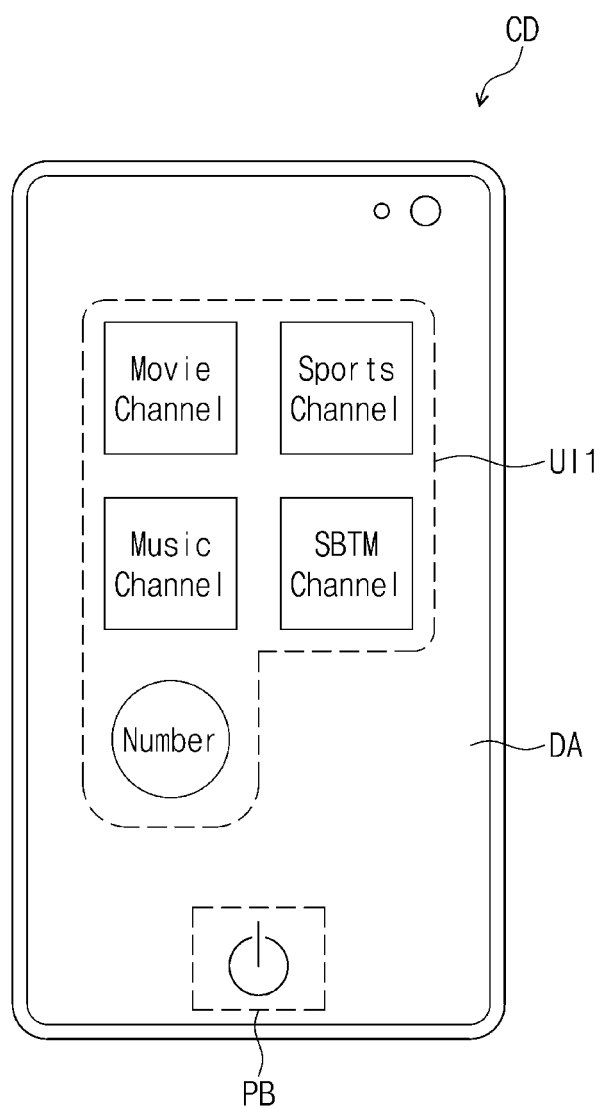
FIG. 3A is a schematic diagram illustrating a user interface of a controller according to an embodiment.
Figure 3B:
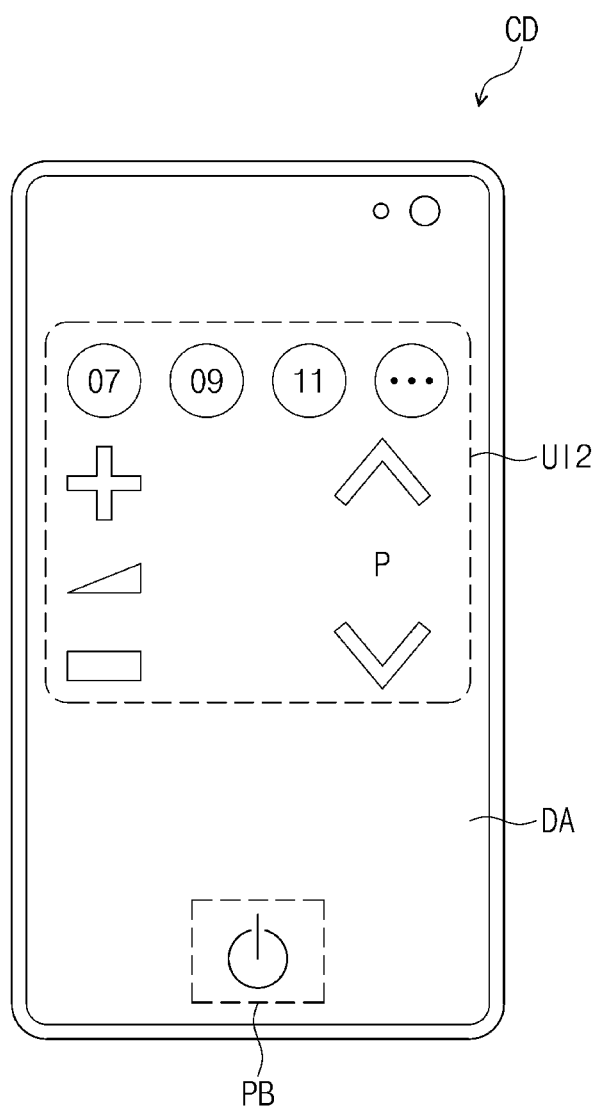
FIG. 3B is a schematic diagram illustrating a user interface of a controller according to an embodiment.

FIG. 3A is a schematic diagram illustrating a user interface of a controller according to an embodiment. FIG. 3B is a schematic diagram illustrating a user interface of a controller according to an embodiment.

Referring to FIGS. 3A and 3B, a power button PB may be displayed on a display area DA. In case that a signal is input to the power button PB, the controller CD may directly perform user authentication. Accordingly, after determining the user using the controller CD, a user interface corresponding thereto may be displayed on the display area DA. FIG. 3A illustrates a first user interface UI1, and FIG. 3B illustrates a second user interface UI2.

The first user interface UI1 may include folder icons and a number icon grouped by preference category. The second user interface UI2 may include a volume control icon, a channel control icon, and a favorite channel icon. For example, in case that the first user authentication information USER1 described in Table 1 is input, the controller CD may display the first user interface UI1 of mode 1. When the second user authentication information USER2 is input, the controller CD may display the second user interface UI2 of mode 2.

Figure 4:
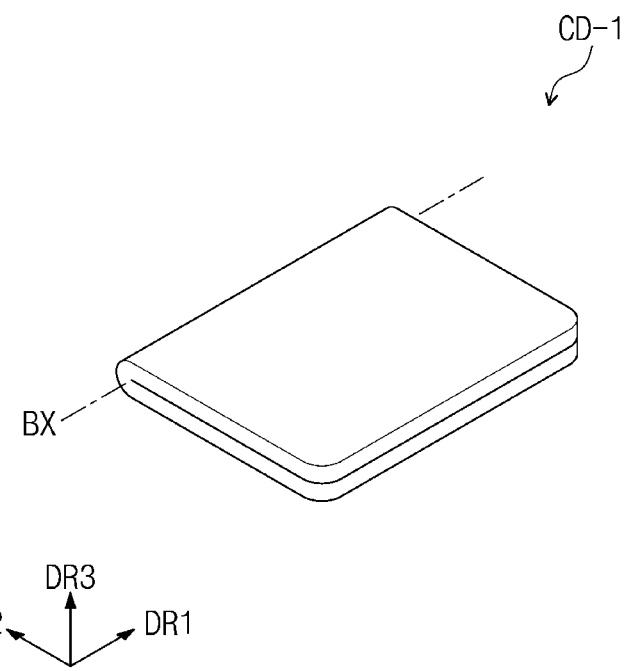
FIG. 4 is a schematic perspective view of a controller according to an embodiment.
Figure 5:
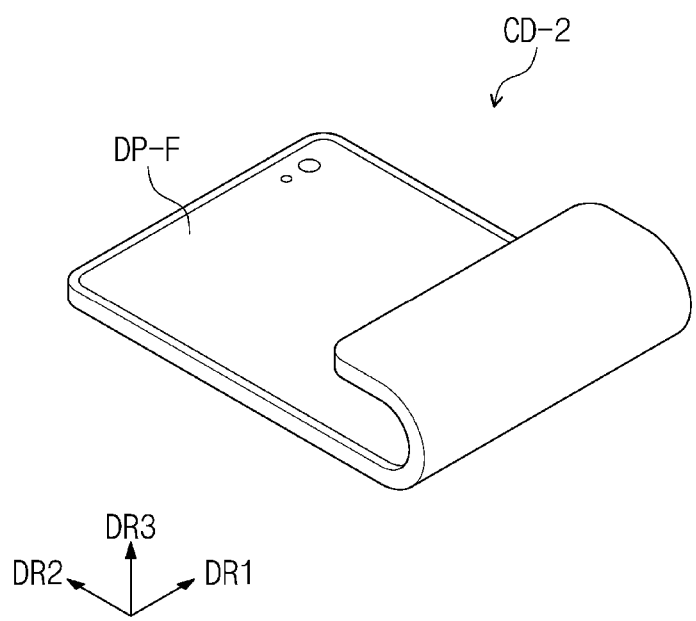
FIG. 5 is a schematic perspective view of a controller according to an embodiment.
Figure 6:
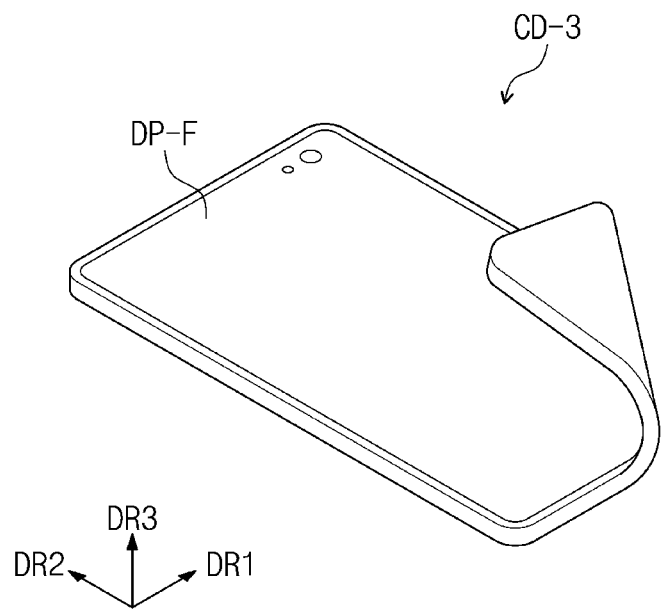
FIG. 6 is a schematic perspective view of a controller according to an embodiment.

FIG. 4 is a schematic perspective view of a controller according to an embodiment. FIG. 5 is a schematic perspective view of a controller according to an embodiment. FIG. 6 is a schematic perspective view of a controller according to an embodiment.

Referring to FIG. 4, the controller CD-1 according to an embodiment may be in-folded based on the bending axis BX. Further, although not shown in the drawing, the controller CD-1 may be out-folded based on the bending axis BX. The bending axis BX may extend along the short axis direction of the controller CD-1, for example, the first direction DR1. However, the embodiments are not limited thereto, and the bending axis BX may extend along the long axis direction of the controller CD-1, for example, the second direction DR2.

Referring to FIG. 5, the controller CD-2 may be folded inward from the end. In another embodiment, the controller CD-2 may be folded outward from the end.

Referring to FIG. 6, the controller CD-3 may be folded in a diagonal direction. Each of the controllers CD-1, CD-2, and CD-3 described with reference to FIGS. 4 to 6 may include a flexible display panel DP-F.

Figure 7:
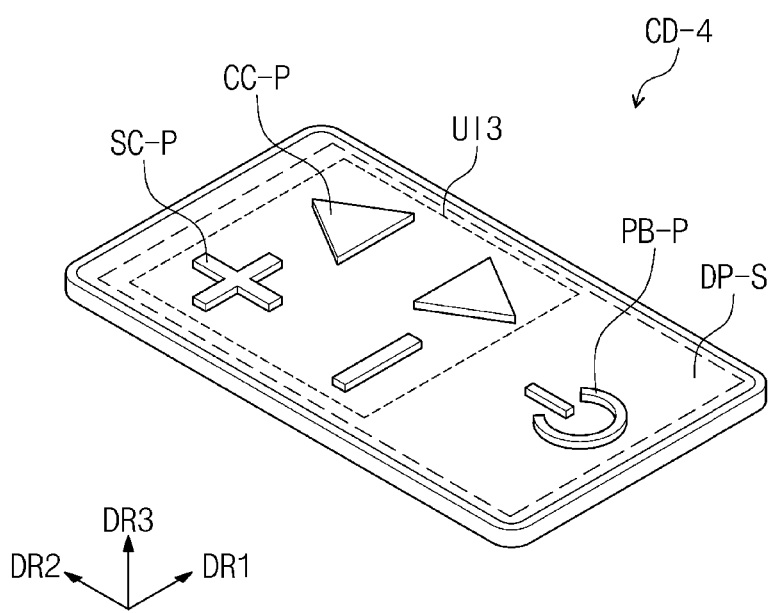
FIG. 7 is a schematic perspective view of a controller according to an embodiment.

FIG. 7 is a schematic perspective view of a controller according to an embodiment.

Referring to FIG. 7, the controller CD-4 may include a stretchable display panel DP-S. A third user interface UI3 may have a three-dimensional shape. For example, the stretchable display panel DP-S in a flat state may be parallel to a plane defined by the first direction DR1 and the second direction DR2.

The thickness direction of the controller CD-4 may be indicated by the third direction DR3. A portion of the stretchable display panel DP-S may protrude in the third direction DR3. FIG. 7 by way of example shows that a power icon PB-P, a volume control icon SC-P, and a channel control icon CC-P may protrude in the third direction DR3.

Figure 8:
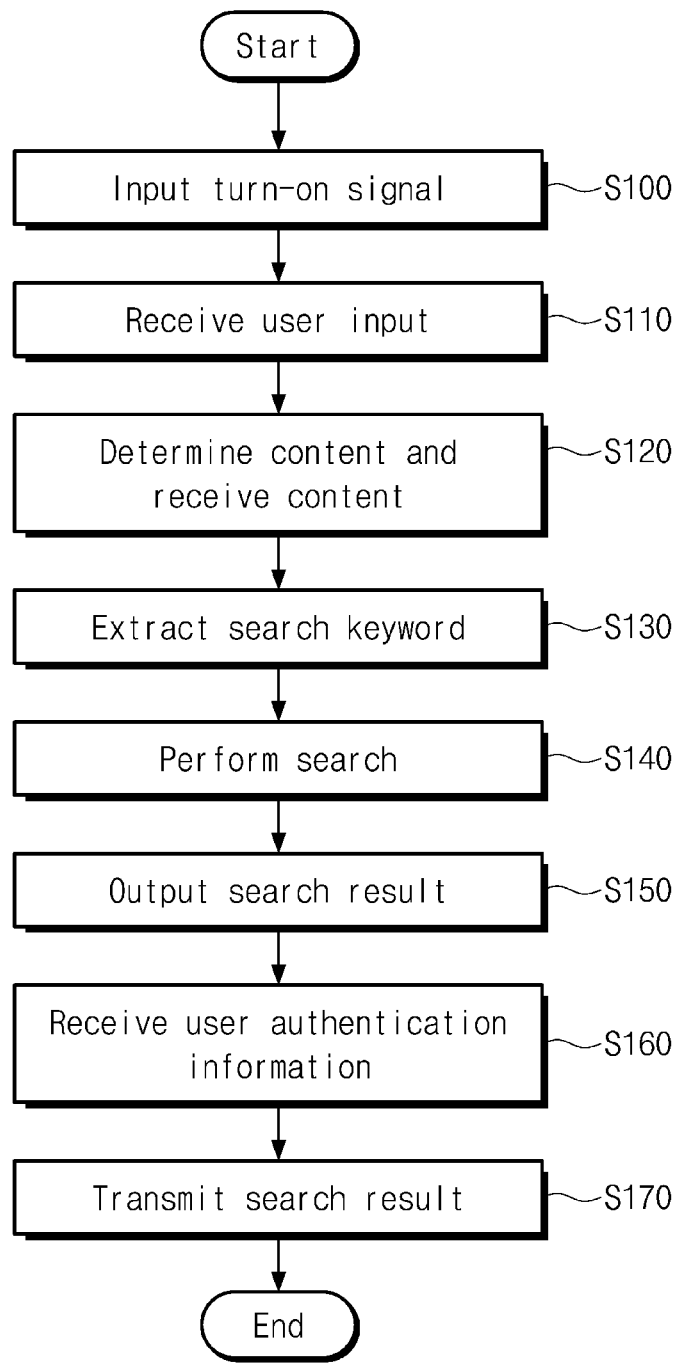
FIG. 8 is a flowchart schematically showing the operation steps of a controller according to an embodiment.

FIG. 8 is a flowchart schematically showing the operation steps of a controller according to an embodiment.

Referring to FIGS. 2, 3A, and 8, a turn-on signal may be input to the controller CD (S100). The turn-on signal may be input through the power button PB. In case that a turn-on signal is input, the controller CD may turn on the first external device EE1 or the second external device EE2 shown in FIG. 1.

The controller CD may receive a user input (S110). For example, a user input may be received through the input detection part 212 or the audio input part 213 of the controller CD. The user input may be a request from a user, for example. For example, the user may input a request for content information to the controller CD through the input detection part 212 or the audio input part 213.

The control part 100 of the controller CD may determine content information and receive data corresponding to the content information from the outside (S120). For example, the controller CD may receive data from the first external device EE1 (see FIG. 1) or the second external device EE2 (see FIG. 1). For example, in case that the requested content is music, the controller CD may receive sound data from the first external device EE1 or the second external device EE2. In case that the requested content is person information, the controller CD may receive image data from the first external device EE1 or the second external device EE2. However, this is only an example, and data received by the controller CD according to the requested content is not limited to a specific example. For example, the data may include both image data and sound data.

The control part 100 of the controller CD may extract the search keyword (S130). For example, if noise may be included in the received data, it may be removed. For example, in case that image data is received from the first external device EE1 or the second external device EE2 in response to a request for product information, the control part 100 may extract the displayed part of the product as a search keyword.

The controller CD may perform a search using the communication part 300 (S140). The search step may use the short-range communication part 310 or the long-range communication part 320. According to an embodiment, real-time search may be possible through the controller CD, so that it may be easier to obtain information on content.

The controller CD may output a search result through the display panel 600 and/or the audio output part 500 (S150). The controller CD may output an image including a message asking the user to transmit the content search result on the display panel 600.

The user US may select whether to transmit the content search result. For example, in case that the user US wants to transmit a content search result, the controller CD may receive user authentication information through the sensor part 200 (S160). The user authentication information may be at least one of a fingerprint, a voice, a face, an iris, and a blood vessel, but is not limited thereto.

The controller CD may refer to the memory 400 in which the address corresponding to the user authentication information may be stored, and transmit the content search result to the address through the communication part 300 (S170).

Figure 9:
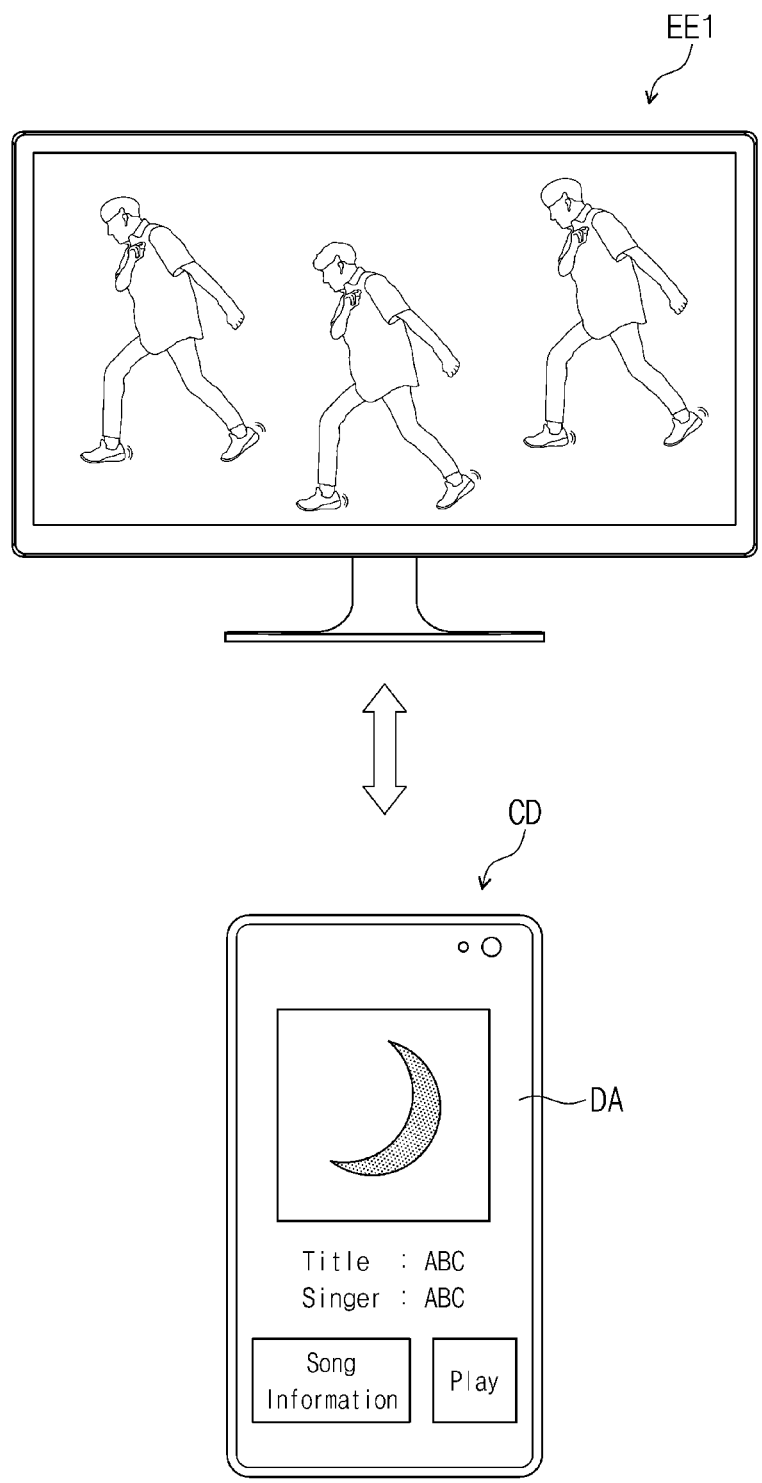
FIG. 9 is a schematic state diagram illustrating an operation example of a controller according to an embodiment.

FIG. 9 is a schematic state diagram illustrating an operation example of a controller according to an embodiment.

Referring to FIGS. 1 and 9, the first external device EE1 may display an image. For example, a music program may be played on the first external device EE1. The user US may input a request for content information to the controller CD. For example, the user US may input a request for music information. The request for music information may be, for example, "What is this song?", "When was the song released?" or "Who sings the song?"

The controller CD may receive data corresponding to the content from the first external device EE1 or the second external device EE2. The data may be, for example, sound data. The controller CD may search for content information based on the data, and may display the search result on the display area DA. For example, the controller CD may display song title and singer information.

Figure 10A:
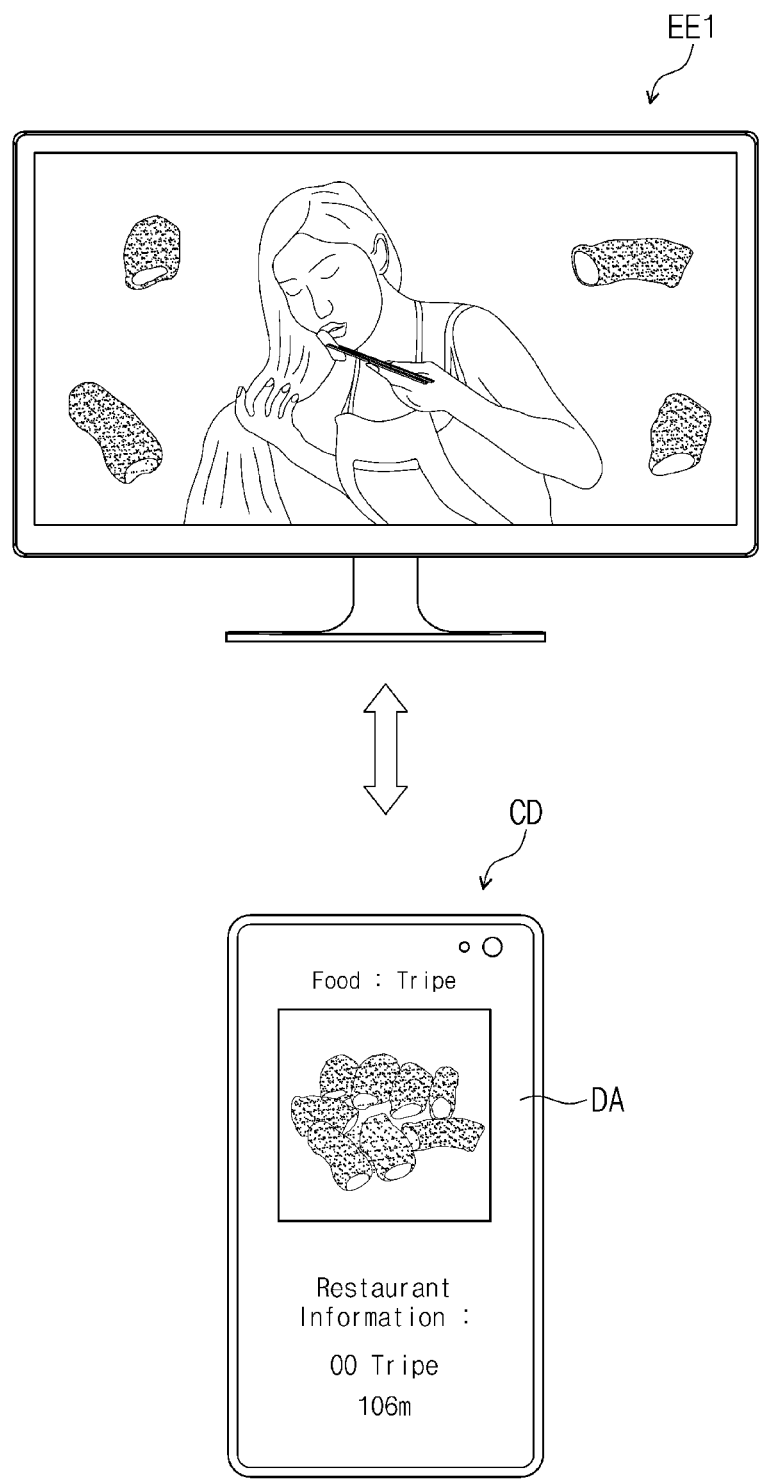
FIG. 10A is a schematic state diagram illustrating an operation example of a controller according to an embodiment.
Figure 10B:
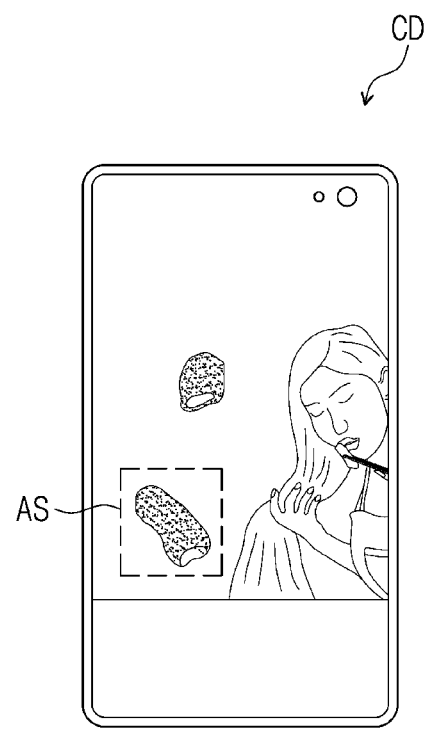
FIG. 10B is a schematic state diagram illustrating an operation example of a controller according to an embodiment.

FIG. 10A is a schematic state diagram illustrating an operation example of a controller according to an embodiment. FIG. 10B is a schematic state diagram illustrating an operation example of a controller according to an embodiment.

Referring to FIGS. 1, 10A, and 10B, the first external device EE1 may display an image. For example, a screen in which a performer is eating food is shown on the first external device EEL The user US may input a request for content information to the controller CD. For example, the user US may input a request for food information. The request for food information may be, for example, "What's the food name?" or "Where's the restaurant that sells this food?".

The controller CD may receive data corresponding to the content from the first external device EE1 or the second external device EE2. The data may be, for example, image data. The image data may be still image data or video data.

Referring to FIG. 10B, the user US or the control part 100 (see FIG. 2) may extract a search keyword AS. For example, in relation to a request for food information, a performer displayed on the screen may correspond to noise. Therefore, the search accuracy may be improved through the step of extracting the search keyword AS. The step of extracting the search keyword AS may be performed through image analysis of the control part 100, or may be performed through an operation in which the user US selects a portion of the display screen.

The controller CD may search for content information based on the data, and may display the search result on the display area DA. For example, the controller CD may display food information, food image information, and nearby restaurant information. However, this is only an example, and the search result displayed on the display area DA may be variously changed.

Figure 11:
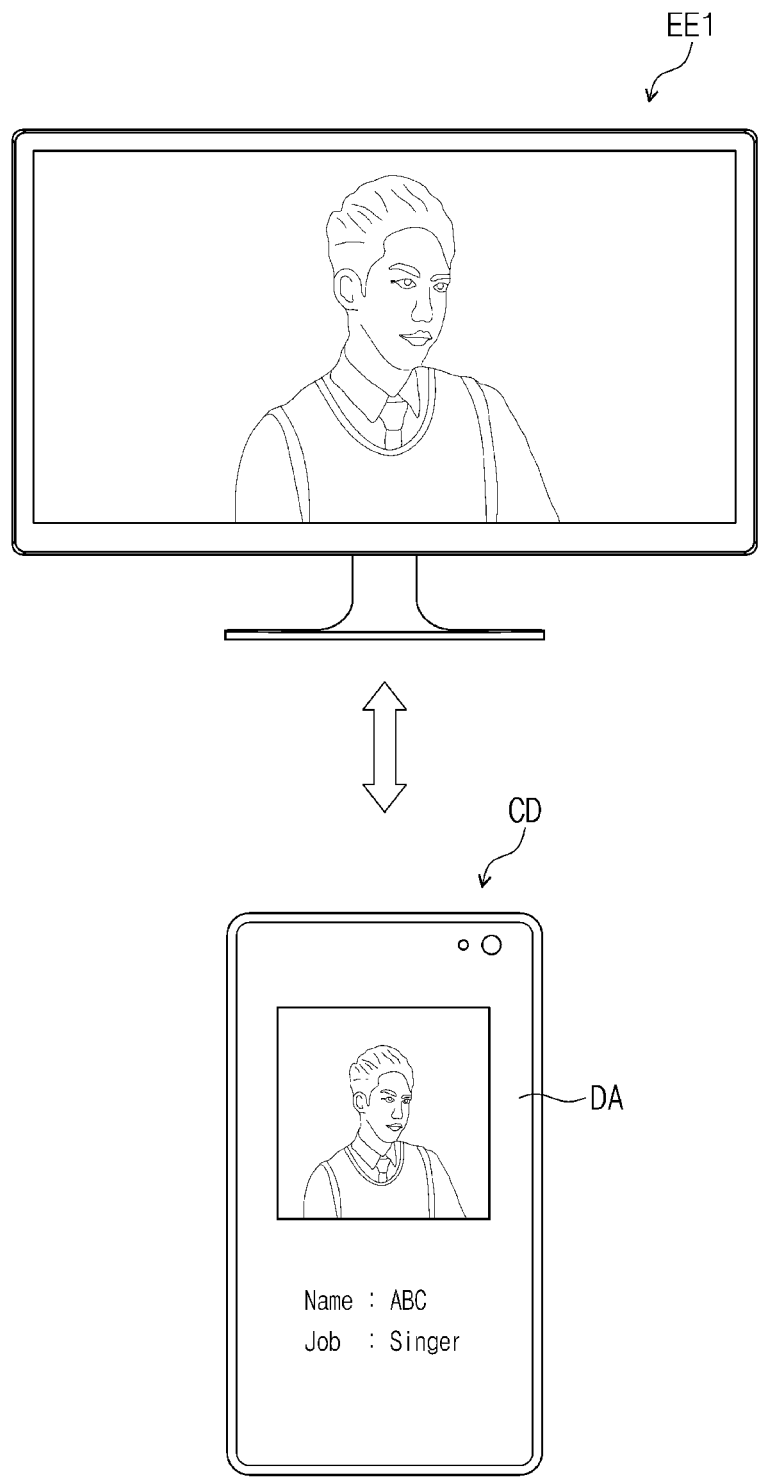
FIG. 11 is a schematic state diagram illustrating an operation example of a controller according to an embodiment.

FIG. 11 is a schematic state diagram illustrating an operation example of a controller according to an embodiment.

Referring to FIGS. 1 and 11, the first external device EE1 may display an image. For example, an entertainment program may be played on the first external device EE1. The user US may input a content request to the controller CD. For example, the user US may input a request for person information. The request for person information may be, for example, "What is that person's name?" or "Who is that person?"

The controller CD may receive data corresponding to the content from the first external device EE1 or the second external device EE2. The data may be, for example, image data. The controller CD may search for content information based on the data, and may display the search result on the display area DA. For example, the controller CD may display a person's profile picture, name, and job information.

Figure 12:
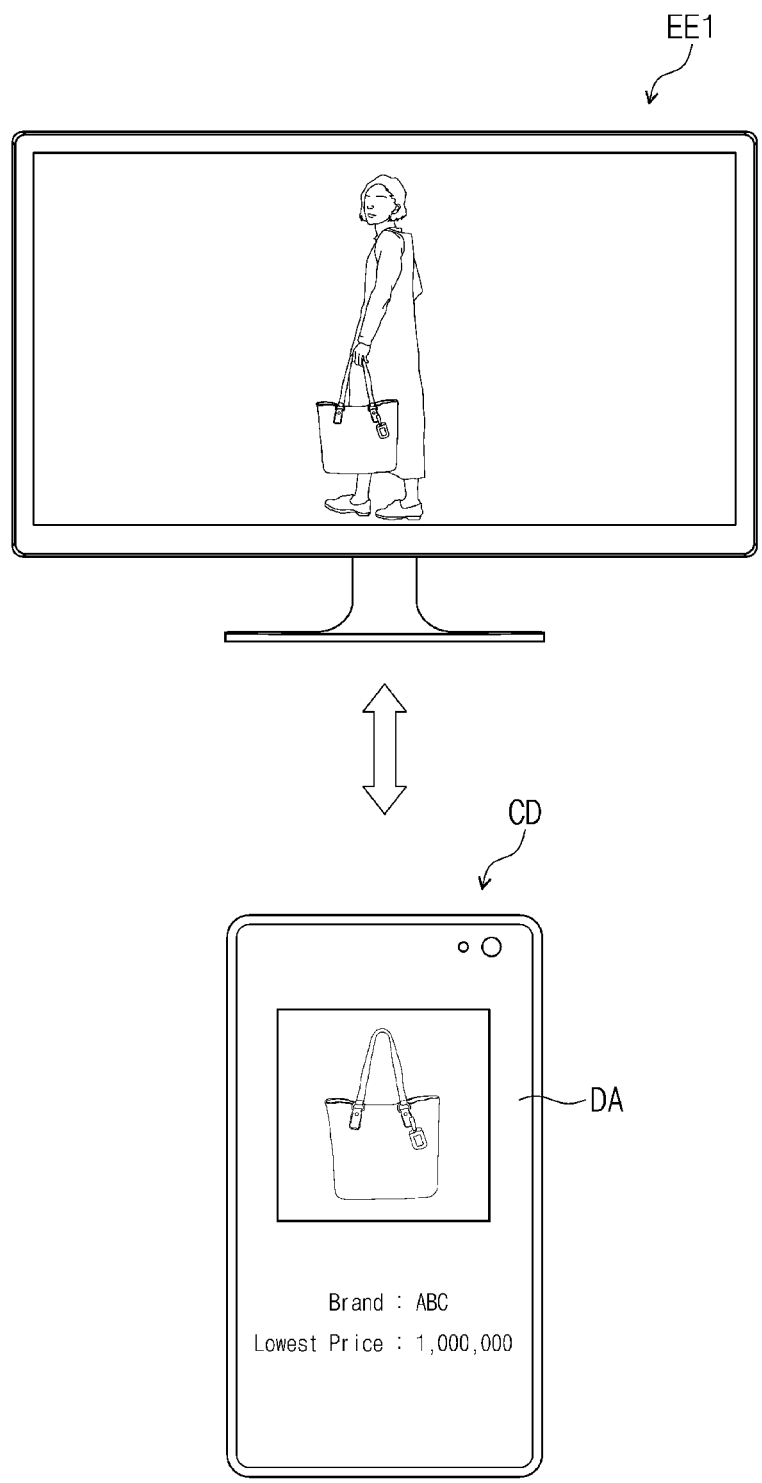
FIG. 12 is a schematic state diagram illustrating an operation example of a controller according to an embodiment.

FIG. 12 is a schematic state diagram illustrating an operation example of a controller according to an embodiment.

Referring to FIGS. 1 and 12, the first external device EE1 may display an image. For example, a drama program may be played on the first external device EEL The user US may input a content request to the controller CD. For example, the user US may input a request for product information. The request for product information may be, for example, "How much is that bag?" or "What is the brand of that bag?"

The controller CD may receive data corresponding to the content from the first external device EE1 or the second external device EE2. The data may be, for example, image data. The controller CD may search for content information based on the data, and may display the search result on the display area DA. For example, the controller CD may display product information, brand information, and price information.

FIG. 13 is a schematic state diagram illustrating an operation example of a controller according to an embodiment.

Referring to FIG. 13, the first external device EE1 may display an image of a first channel CH-A, and the controller CD may display an image of a second channel CH-B. The first channel CH-A and the second channel CH-B may be different channels. The controller CD may receive image data of the second channel CH-B through the second external device EE2 (refer to FIG. 1). The image may be a video.

The user US (see FIG. 1) may preview another channel through the controller CD before changing the first channel CH-A played back in the first external device EE1 to another channel. Accordingly, the user US may obtain information on another channel through the controller CD without changing the channel of the first external device EE1 before selecting the channel.

FIG. 14 is a schematic state diagram illustrating an operation example of a controller according to an embodiment.

Referring to FIG. 14, the first external device EE1 may display an image of the first channel CH-A, and the controller CD may display subtitles SCB of the first channel CH-A.

FIG. 15 is a schematic state diagram illustrating an operation example of a controller according to an embodiment.

Referring to FIG. 15, the first external device EE1 and the controller CD may display the same image. For example, an image of the first external device EE1 may be displayed on the controller CD, or an image of the controller CD may be displayed on the first external device EEL For example, bidirectional mirroring between the first external device EE1 and the controller CD may be possible. In case that the user US (see FIG. 1) moves to a place where the first external device EE1 is not visible, the image of the first external device EE1 may be continuously viewed through the controller CD. Since the controller CD has a smaller display screen size than the first external device EE1, the operating frequencies may be different from each other. For example, the controller CD may be driven with a lower frequency than the first external device EE1 and may be driven with a lower power consumption.

Figure 16:
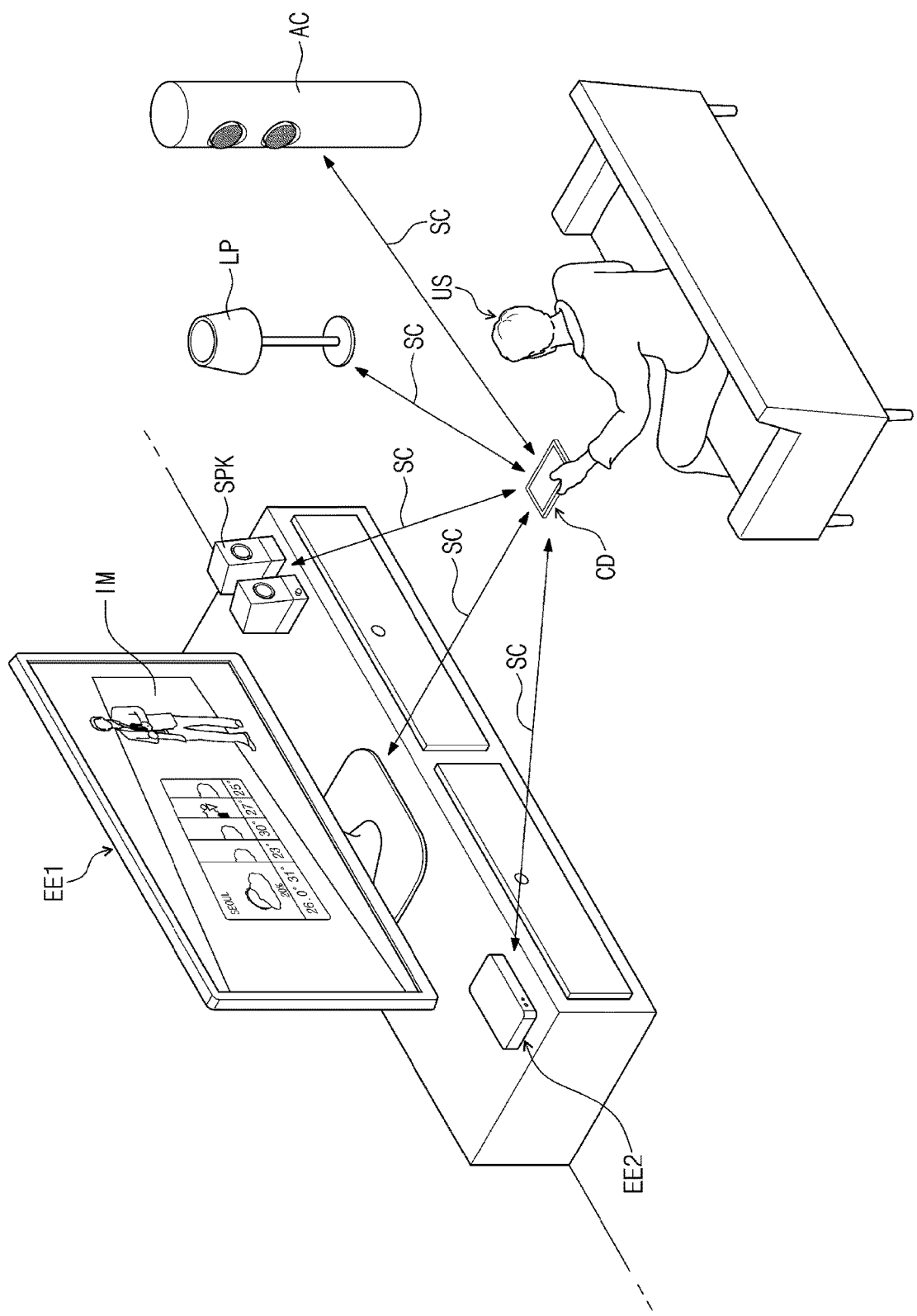
FIG. 16 schematically shows an example of using a controller according to an embodiment.

FIG. 16 schematically shows an example of using a controller according to an embodiment.

Referring to FIG. 16, the controller CD may control other external devices in addition to the first external device EE1 and the second external device EE2. For example, it may be possible to control a temperature control device AC, a lighting device LP, or an audio output device SPK. The controller CD may output a control signal to the temperature control device AC, the lighting device LP, or the audio output device SPK through the communication part 300 (see FIG. 2).

Figure 17:
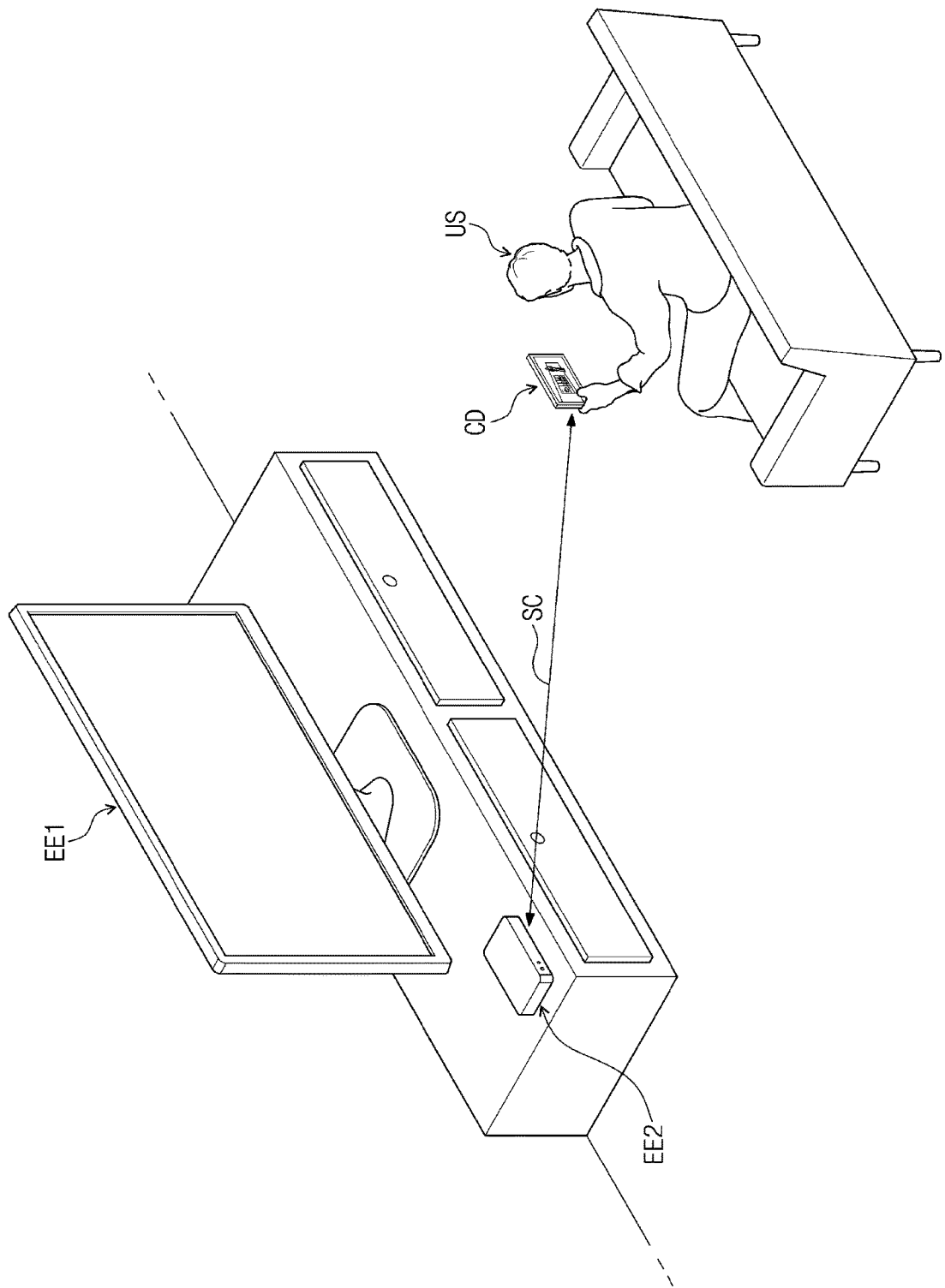
FIG. 17 schematically shows an example of using a controller according to an embodiment.

FIG. 17 schematically shows an example of using a controller according to an embodiment.

Referring to FIG. 17, the controller CD may receive data from the second external device EE2 before the first external device EE1 may be turned on. An image corresponding to the data may be displayed on the display area DA of the controller CD. Accordingly, the user US may first select a channel and then turn on the first external device EEL FIG. 18 schematically illustrates a controller according to an embodiment.

Figure 18:
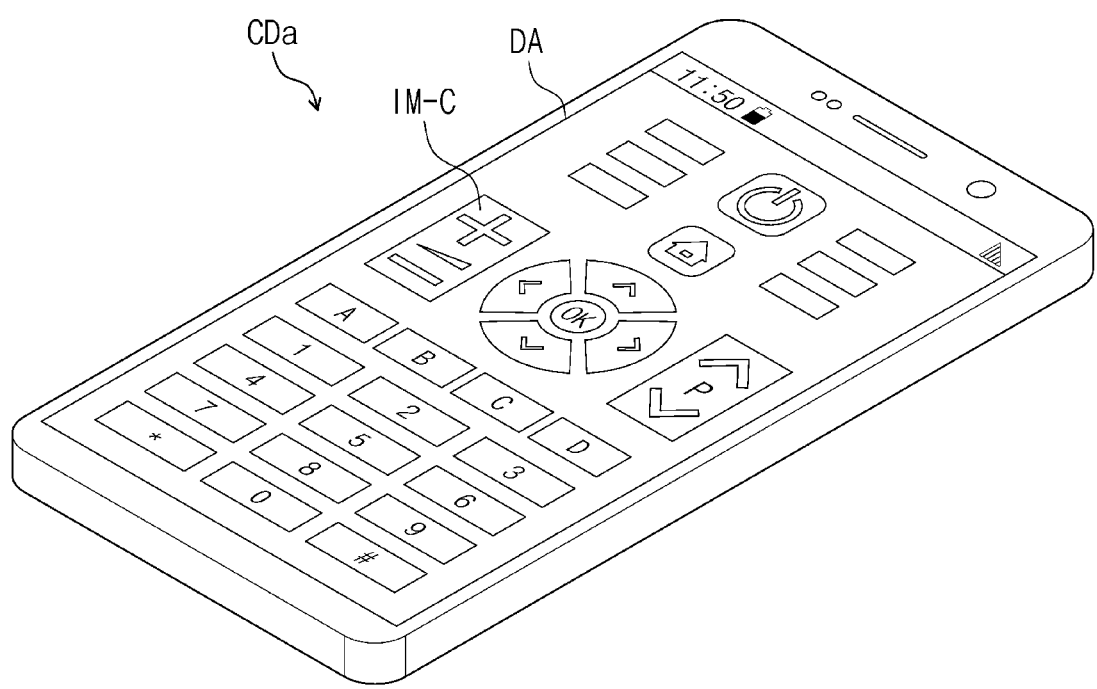
FIG. 18 schematically illustrates a controller according to an embodiment.

The control image IM-C may be displayed on the display area DA of the controller CDa shown in FIG. 18, and the user may control the first external device EE1 (see FIG. 1) or the second external device EE2 (see FIG. 1) by touching the control image IM-C.

FIG. 18 illustrates a smartphone as an example of the controller CDa, but is not limited thereto, and the controller CDa may be a tablet PC, a watch type display device, or other wearable display device.

The disclosure relates to a controller capable of short-range communication and long-range communication, and the controller may receive data corresponding to content from an external device and search for the data. In other words, it may be possible to provide a controller that makes the process of acquiring information about the content easier, and thus has high industrial applicability.

Although described above with reference to the embodiments, a person having ordinary knowledge in the relevant technical field will appreciate that various modifications and changes may be made to the embodiments without departing from the spirit and scope of the inventive concept. Therefore, the technical scope of the invention should not be limited to the content described in the detailed description of the specification, but should be determined by the claims including equivalents thereof.

What is claimed is:

1. A controller comprising:
   an input part that receives a content request for content information related to an image displayed on a first external device;
   a control part that determines content based on the content request;
   a communication part that receives data corresponding to the content from the first external device and searches for content information based on the data;
   a display panel that displays a search result for the content request;
   a sensor part that receives user authentication information that identifies a user; and
   a memory that stores the user authentication information and an address corresponding to the user authentication information, wherein
   the control part is configured to identify the address based on the user authentication information received through the sensor part and transmit the search result to the address via the communication part, wherein
   the user authentication information is a bio information, and
   the address comprises at least one of an email address and a mobile phone number.

2. The controller of claim 1, wherein the input part comprises at least one of an input detection part and an audio input part.

3. The controller of claim 1, wherein the received data is at least one of sound data, still image data, and video data.

4. The controller of claim 1, wherein the bio information is at least one of fingerprint, voice, face, iris, and blood vessel.

5. The controller of claim 1, wherein the sensor part comprises at least one of a camera part, an input detection part, a fingerprint detection part, and an audio input part.

6. The controller of claim 1, wherein the memory stores user interface information corresponding to the user authentication information.

7. The controller of claim 1, wherein
   the first external device displays an image of a first channel, and
   the display panel displays an image of a second channel.

8. The controller of claim 7, further comprising an audio output part for outputting sound, wherein the audio output part outputs the sound of the second channel.

9. The controller of claim 1, wherein the first external device and the display panel display the same image.

10. The controller of claim 1, wherein
    the first external device displays an image of a first channel, and
    the display panel displays subtitles of the first channel.

11. The controller of claim 1, wherein
    the communication part transmits a control signal to a second external device, and
    the second external device is at least one of a temperature control device, a lighting device, and a sound output device.

12. The controller of claim 1, wherein
    the first external device is a display device, and
    the display device communicates with a set-top box.

13. The controller of claim 12, wherein an image corresponding to an image data is displayed on the display panel by receiving the image data from the set-top box before the first external device is turned on.

14. The controller of claim 1, wherein the first external device is a set-top box.

15. The controller of claim 1, wherein the display panel is a flexible display panel.

16. The controller of claim 1, wherein the display panel is a stretchable display panel.

17. The controller of claim 1, wherein the communication part comprises:
    a short-range communication part that receives data corresponding to the content from the first external device; and
    a long-range communication part that searches for the content information based on the data, wherein the short-range communication part or the long-range communication part transmits the search result to the address.

18. The controller of claim 1, wherein
    the sensor part is configured to receive a plurality of user authentication information from multiple different users,
    the memory is configured to store the plurality of user authentication information for the different users, and an address corresponding to each respective user authentication information, and
    the communication part is configured to identify the address based on receiving first user authentication information for a first user of the multiple different users and transmit the search result to the address corresponding to the first user authentication information.

19. The controller of claim 1, wherein the control part does not transmit the search result to addresses not corresponding to the user authentication information.

* * * * *